United States Patent [19]

Oshima et al.

[11] Patent Number: 4,575,534

[45] Date of Patent: Mar. 11, 1986

[54] STYRENE-BUTADIENE COPOLYMER RUBBER COMPOSITION

[75] Inventors: Noboru Oshima, Suzuka; Isamu Shimizu, Kameyama; Mikio Takeuchi, Yokkaichi; Tatsuo Fujimaki, Higashimurayama; Shinsuke Yamaguchi, Higashikurume, all of Japan

[73] Assignees: Bridgestone Tire Company Limited; Japan Synthetic Rubber Company Limited, both of Japan

[21] Appl. No.: 597,635

[22] Filed: Apr. 6, 1984

[30] Foreign Application Priority Data

Apr. 6, 1983 [JP] Japan ................................. 58-59362

[51] Int. Cl.$^4$ ........................... C08L 9/00; C08L 53/00
[52] U.S. Cl. ................................. 525/99; 525/271; 525/314; 525/331.9
[58] Field of Search ............... 525/99, 271, 331.9, 525/314

[56] References Cited

U.S. PATENT DOCUMENTS 4,199,490  2/1980  Kamiya et al. .................... 525/96
4,405,754  9/1983  Moczygemba et al. ............ 525/102

*Primary Examiner*—Jacob Ziegler
*Attorney, Agent, or Firm*—Sughrue, Mion, Zinn, Macpeak, and Seas

[57] ABSTRACT

Disclosed herein is a rubber composition comprising at least 20% by weight of styrene-butadiene copolymer based on the total weight of the rubber content. The styrene-butadiene copolymer is obtained by randomly copolymerizing styrene with 1,3-butadiene in a hydrocarbon solvent in the presence of an organolithium compound as an initiator and then subjecting to a coupling reaction with a polyfunctional coupling agent, and contains 30–70% by weight of branched polymers therein, and has the following properties:

(a) a content of bound styrene in the copolymer 3–15% by weight;
(b) a content of vinyl bonds contained in the butadiene units is 15–30% by weight;
(c) a Mooney viscosity ($ML_{1+4}{}^{100°\,C.}$) is 15–50; and
(d) a molecular weight distribution of the copolymer is bimodal at a ratio $\overline{M}w/\overline{M}n$ of 1.4–2.2 in which $\overline{M}w$ is a weight-average molecular weight and $\overline{M}n$ is a number-average molecular weight.

3 Claims, No Drawings

STYRENE-BUTADIENE COPOLYMER RUBBER COMPOSITION

BACKGROUND OF THE INVENTION (1) Field of the Invention

This invention relates to a rubber composition containing at least 20% by weight of styrene-butadiene copolymer and having excellent rebound resilience and processability.

(2) Description of the Prior Art

Heretofore, polybutadiene rubber has not quite been used alone, but has been used together with natural rubber, polyisoprene rubber, styrene-butadiene copolymer and the like.

As the polybutadiene rubber, there have mainly been used high cis-polybutadienes obtained by using a Ziegler catalyst, and low cis-polybutadienes obtained by using an organolithium compound. However, although these polybutadienes have an excellent rebound resilience as compared with other rubber materials owing to the low glass transition temperature, they contain a large amount of a low molecular weight component which is poor in the rebound resilience because the molecular weight distribution thereof is set wider so as to increase the processability and prevent the cold flow of the raw rubber.

On the other hand, there are known polybutadienes having a narrow range of molecular weight distribution, which are obtained by using an organolithium compound, and polybutadienes having a bimodal molecular weight distribution, but they are inferior in the wear resistance and tensile strength to the above polybutadienes having a wider range of the molecular weight distribution.

SUMMARY OF THE INVENTION

It is, therefore, an object of the invention to provide a styrene-butadiene copolymer rubber composition having a low cold flow characteristic and a good extrusion processability without decreasing wear resistance, rebound resilience and tensile strength.

The inventors have found that the above object is achieved by using a rubber composition containing styrene-butadiene copolymer with a narrow and bimodal molecular weight distribution composed of a low molecular weight component and a brached polymer component of a high molecular weight, a relatively low Mooney viscosity, a low content of bound styrene, and a low content of vinyl bond.

According to the invention, there is the provision of a rubber composition comprising at least 20% by weight of styrene-butadiene copolymer based on the total weight of the rubber content, said styrene-butadiene copolymer being a copolymer containing 30–70% by weight of branched polymers therein obtained by randomly polymerizing styrene with 1,3-butadiene in a hydrocarbon solvent in the presence of an organolithium compound as an initiator and then subjecting to a coupling reaction with a polyfunctional coupling agent, and having the following properties:

(a) a content of bound styrene in the copolymer is 3–15% by weight;
(b) a content of vinyl bond contained in the butadiene units is 15–30% by weight;
(c) a Mooney viscosity ($ML_{1+4}^{100°\ C.}$) is 15–50; and
(d) a molecular weight distribution of the copolymer is bimodal at a ratio $\overline{Mw}/\overline{Mn}$ of 1.4–2.2 in which $\overline{Mw}$ is a weight-average molecular weight and $\overline{Mn}$ is a number-average molecular weight.

DETAILED DESCRIPTION OF THE INVENTION

The styrene-butadiene copolymers according to the invention characterized by having a relatively low Mooney viscosity and a narrow molecular weight distribution wherein the low molecular weight component and a high molecular weight branched polymer component are contained in the copolymer at a predetermined weight ratio (the high molecular weight component being contained in an amount of 30–70% by weight based on the total weight of the copolymer). Since the copolymers according to the invention contain the low molecular weight component having a low Mooney viscosity despite of the narrower molecular weight distribution, they are high in the extrusion speed, good in the luster and skin of an extruded product, small in the die swell and shrinkage, and excellent in the extrusion processability. Since the copolymer according to the invention contain a branched polymer component coupled with a polyfunctional coupling agent, they suffers no cold flow and has a good storing stability for raw rubber.

Despite that the styrene units are introduced into the molecular chains, the polymer according to the invention is narrow in the molecular weight distribution of the low molecular weight component, and small in that portion having $\overline{Mn}$ of not more than 30,000 which does not participate in the formation of crosslinked network structure, so that it has the same or more excellent performances than the conventional polybutadiene in terms of wear resistance, rebound resilience and tensile strength of vulcanizate.

The molecular weight distribution of the styrene-butadiene copolymer according to the invention is bimodal and has the ratio $\overline{Mw}/\overline{Mn}$ of 1.4–2.2. If $\overline{Mw}/\overline{Mn}$ exceeds 2.2, the low molecular weight component not participating in the crosslinked network structure or the component having the number-average molecular weight of less than about 30,000 increases unfavorably. On the other hand, if $\overline{Mw}/\overline{Mn}$ is less than 1.4, it is practically difficult to produce the polymer.

The ratio of the branched polymer having a high molecular weight in the bimodal molecular weight distribution is determined by a ratio of peak area on the high molecular side to the whole peak area when measured by a gel permeation chromatography (GPC), and is 30–70% by weight. If the ratio exceeds 70% by weight, the processability is not improved, while if it is less than 30% by weight, the vulcanizate is poor in the tensile strength, rebound resilience and cold flow.

The styrene-butadiene copolymer according to the invention has a Mooney viscosity ($ML_{1+4}^{100°\ C.}$) of 15–50, preferably 20–45. If the viscosity is less than 15, the vulcanizate is poor in the tensile strength, rebound resilience, wear resistance, and cold flow, while if it exceeds 50, the extrusion processability is poor.

In the styrene-butadiene copolymer according to the invention, the content of bound styrene is 3–15% by weight, preferably 5–10% by weight. If the content of bound styrene is less than 3% by weight, the vulcanizate is poor in the tensile strength and wear resistance, while if it exceeds 14% by weight, the vulcanizate is poor in the rebound resilience. Further, the bound styrene necessary to be randomly arranged in the styrene-butadiene copolymer according to the invention, so that the content of block polystyrene in total bound styrene is preferably 10% at most when measured by an oxidation decomposition method described by I. M. Kolthoff et al in J. Polymer Sci., Vol. 1, 429(1946).

The content of vinyl bond contained in the butadiene units in the styrene-butadiene copolymer according to the invention is 15–30% by weight. If the content exceeds 30%, the vulcanizate is poor in the tensile strength, wear resistance and rebound resilience. If it is less than 15%, the randomness of bound styrene is deteriorated and the low molecular weight component of not more than 30,000 in $\overline{Mn}$ is increased, so that this is not preferable in terms of the rebound resilience, tensile strength, and wear resistance of the vulcanizate.

The styrene-butadiene copolymer according to the invention are obtained by polymerizing styrene with 1,3-butadiene in a hydrocarbon solvent in the presence of at least one compound selected from ether, tertiary amine, potassium salt of an organosulfonic acid, potassium salt of alcohol and potassium salt of phenol, while using an organolithium compound as an initiator, and then coupling the resulting product with a polyfunctional coupling agent.

As the hydrocarbon solvent, use may be made of hexane, cyclohexane, methylcyclopentane, octane, heptane, benzene and the like. As the organolithium compound, use may be made of n-butyllithium, sec-butyllithium, tert-butyllithium, amyllithium, octyllithium and the like.

As the ether, mention may be made of diethyl ether, dibutyl ether, anisole, tetrahydrofuran, dioxane, o-dimethoxybenzene ethylene glycol dimethyl ether, ethylene glycol dibutyl ether, diethylene glycol dimethyl ether and the like. As the tertiary amine, mention may be made of triethylamine, N-methylmorpholine, pyridine, N,N,N',N'-tetramethylethylenediamine, triethylenediamine and the like. Each of these compounds is used in such an amount that the content of vinyl bond in the butadiene units in the resulting copolymer is not more than 30%.

As the potassium salt of organosulfonic acid, may be used potassium dodecylbenzene sulfonate, and as the potassium salt of alcohol may be used potassium salts of tertiary butanol and isoamyl alcohol, and as the potassium salt of phenol may be used of potassium salt of nonylphenol. The polymerization temperature is set in a range of 0°–120° C.

As the polyfunctional coupling agent, mention may be made of halogenated tin or silicon such as tin methyltrichloride, tin butyltrichloride, silicon methyltrichloride, silicon butyltrichloride, tin tetrachloride, silicon tetrachloride and the like; diester of organic carboxylic acid such as diethyl adipate, diphenyl adipate and the like; diester of carbonic acid such as propylene glycol carbonate, ethylene glycol carbonate, and the like.

The rubber composition according to the invention is required to contain at least 20% by weight of the above styrene-butadiene copolymer based on the whole rubber content. If the copolymer content is less than 20% by weight, the excellent properties, such as extrusion-processability, rebound resilience, wear resistance and so on, of the styrene-butadiene copolymer according to the invention cannot be fully exhibited.

If necessary, the styrene-butadiene copolymer according to the invention is used by blending with at least one rubber selected from natural rubber, high cis-1,4-polyisoprene, emulsion polymerized styrene-butadiene copolymer and solution polymerized styrene-butadiene copolymer. Moreover, the copolymer according to the invention may be used by blending with high cis-1,4-polybutadiene or low cis-1,4-polybutadiene.

Further, the rubber composition according to the invention may be extended with oil, added with additives usually used for vulcanizate, a filler and the like, and then vulcanized under usual conditions, if necessary.

The rubber composition containing of styrene-butadiene copolymer according to the invention can be used as industrial products such as tire tread, tire undertread, tire sidewall, tire bead portion, belt, hose, window frame, rubber vibration isolator, marine fender and the like.

The following examples are given in illustration of the invention and are not intended as limitations thereof.

Various properties were measured and evaluated as follows:

The tensile properties were measured according to JIS K6301.

The rebound resilience was measured by means of a Dunlop tripsometer.

The wear resistance was measured by means of a Pico type abrasion machine and indicated by an index.

The extrusion processability was evaluated according to ASTM D2230-63T by using an extruder with a bore diameter of 2 inches (rotation number of screw: 30 rpm, bed temperature: 80° C., cylinder temperature: 70° C.).

The mill shrinkage was determined by marking a square standard line of 15 cm × 15 cm on a rubber sheet specimen after being wound around a roll of 10 inch diameter (temperature: 50° C., number of revolution F/B: 20–20 rpm, nip 1 mm) for two minutes, and then measuring the standard line after the specimen was left to stand at room temperature for 1 hour.

The microstructure of the butadiene portion in the styrene-butadiene copolymer was determined by the infrared spectrophotometry (Morero's method). The content of bound styrene was determined from a calibration curve based on absorption of phenyl group at 699 cm$^{-1}$ by the infrared spectrophotometry.

The cold flow was measured by extruding the rubber composition through an orifice of ¼ inch diameter at a temperature of 50° C. under a pressure of 3.5 lb/inch$^2$. After the extrusion was continued for 10 minutes to obtain a stationary rate, the extrusion speed was measured and the measured value was indicated by milligram per minute.

The ratio of $\overline{Mw}/\overline{Mn}$ was measured by using a light-scattering type gel permeation chromatography.

EXAMPLES 1–4; COMPARATIVE EXAMPLES 1–11

Samples used for the evaluation were obtained as follows. The properties of raw rubber polymers are shown in the following Table 1.

Sample A

Into a reactor of 10 l capacity were charged 2,500 g of cyclohexane, 25 g of styrene, 475 g of 1,3-butadiene and 1 g of tetrahydrofuran. After the temperature of the reaction system was adjusted to 40° C., 0.325 g of n-butyllithium was added to start polymerization. After 30 minutes, the polymerization temperature reached about 100° C. and the conversion rate for polymeriza- TABLE 1-continued

| Sample | A | B | C | D | E | F | G | H | I | J | K | L | M |
|---|---|---|---|---|---|---|---|---|---|---|---|---|---|
| the copolymer (%) Cold flow (mg/mm) | 0.6 | 0.5 | 0.5 | 2.0 | 0 | 0.2 | 0.3 | 0.2 | 0.4 | 0.5 | 0 | 2.0 | 2.5 |

TABLE 2

Compounding Recipe

| | Parts by weight |
|---|---|
| Polymer | 100 |
| Carbon black HAF | 50 |
| ZnO #1 | 3 |
| Stearic acid | 1 |
| Vulcanization accelerator NS* | 1 |
| Sulfur | 1.75 |

*n-tert-butyl-2-benzothiazylsulfenamide

TABLE 3

| | Example | | | | | Comparative Example | | | | | | | | | | |
|---|---|---|---|---|---|---|---|---|---|---|---|---|---|---|---|---|
| | 1 | 2 | 3 | 4 | 5 | 1 | 2 | 3 | 4 | 5 | 6 | 7 | 8 | 9 | 10 | 11 |
| Sample | A | B | B | C | B | D | E | F | G | H | I | J | K | L | M | B |
| Amount of sample compounded | 60 | 60 | 60 | 60 | 30 | 60 | 60 | 60 | 60 | 60 | 60 | 60 | 60 | 60 | 60 | 15 |
| Natural rubber (RSS #3) | 40 | 40 | 30 | 40 | 70 | 40 | 40 | 40 | 40 | 40 | 40 | 40 | 40 | 40 | 40 | 85 |
| SBR #1500 | 0 | 0 | 10 | 0 | 0 | 0 | 0 | 0 | 0 | 0 | 0 | 0 | 0 | 0 | 0 | 0 |
| Extrusion processabilities | | | | | | | | | | | | | | | | |
| Extrusion amount through Garvey die (cc/min) | 280 | 300 | 290 | 280 | 275 | 280 | 240 | 270 | 275 | 290 | 290 | 280 | 270 | 320 | 250 | 270 |
| Die swell (%) | 30 | 28 | 31 | 32 | 33 | 50 | 26 | 53 | 30 | 30 | 31 | 30 | 40 | 27 | 77 | 48 |
| Evaluation on Garvey die profile | 16 | 16 | 16 | 16 | 16 | 14 | 14 | 16 | 16 | 16 | 16 | 16 | 15 | 16 | 15 | 16 |
| Mill shrinkage of rubber blend (%) | 12 | 11 | 12 | 12 | 13 | 17 | 10 | 17 | 12 | 12 | 12 | 12 | 15 | 11 | 22 | 18 |
| Properties of vulcanizate | | | | | | | | | | | | | | | | |
| 300% modulus (kg · f/cm$^2$) | 182 | 185 | 183 | 185 | 180 | 183 | 185 | 170 | 180 | 185 | 185 | 185 | 185 | 170 | 165 | 175 |
| Tensile strength (kg · f/cm$^2$) | 290 | 295 | 300 | 300 | 310 | 275 | 285 | 295 | 276 | 300 | 275 | 280 | 300 | 275 | 290 | 315 |
| Elongation (%) | 425 | 430 | 440 | 440 | 440 | 400 | 400 | 430 | 410 | 440 | 400 | 400 | 440 | 400 | 430 | 440 |
| Dunlop rebound resilience (%) | | | | | | | | | | | | | | | | |
| 25° C. | 73 | 73 | 72 | 73 | 73 | 70 | 72 | 71 | 73 | 69 | 67 | 67 | 73 | 70 | 71 | 72 |
| 70° C. | 77 | 77 | 77 | 77 | 77 | 74 | 76 | 74 | 77 | 72 | 76 | 74 | 77 | 75 | 75 | 76 |
| Pico type abrasion index* | 100 | 105 | 110 | 105 | 100 | 95 | 100 | 100 | 95 | 110 | 90 | 90 | 105 | 90 | 100 | 95 |

*The larger the index, the better the property.

What is claimed is:

1. A rubber composition comprising at least 20% by weight of styrene-butadiene copolymer based on the total weight of the rubber content, said styrene-butadiene copolymer being a copolymer containing 30-70% by weight of branched polymers therein obtained by randomly copolymerizing stryene with 1,3-butadiene at a temperature within a range of 0° to 120° C. in a hydrocarbon solvent in the presence of an organolithium compound as an initiator and in the presence of at least one compound selected from an ether, a tertiary amine, a potassium salt of an organosulfonic acid, a potassium salt of an alcohol and a potassium salt of a phenol, and then subjecting to a coupling reaction with a polyfunctional coupling agent, and having the following properties:

(a) a content of bound styrene in the copolymer is 3-15% by weight;

(b) a content of vinyl bond contained in the butadiene units is 15-30% by weight;

(c) a Mooney viscosity ($ML_{1+4}^{100° C.}$) is 15-50; and (d) a molecular weight distribution of the copolymer is bimodal at a ratio $\overline{Mw}/\overline{Mn}$ of 1.4–2.2 in which $\overline{Mw}$ is a weight-average molecular weight and $\overline{Mn}$ is a number-average molecular weight.

2. A rubber composition according to claim 1, wherein said content of bound styrene is 5-10% by weight.

3. A rubber composition according to claim 1, wherein said composition further contains at least one rubber selected from natural rubber, high cis-1,4 polyisoprene, emulsion polymerized styrene-butadiene copolymer, a different solution polymerized styrene-butadiene copolymer, high cis-1,4 polybutadiene and low cis-1,4 polybutadiene.

* * * * * tion reached 100%. Then, 0.21 g of silicon tetrachloride was added to perform coupling reaction. The resulting polymer solution was added with 2.5 g of 2,6-di-tert-butyl p-cresol, desolvated and dried to obtain the intended polymer.

Sample B

The same procedure as in Sample A was repeated except that 50 g of styrene and 450 g of 1,3-butadiene were used.

Sample C

The same procedure as in Sample A was repeated except that 60 g of styrene, 440 g of 1,3-butadiene, 0.5 g of tetrahydrofuran were used and further 0.25 g of tin n-butyltrichloride was used as a coupling agent.

Sample D

The same procedure as in Sample B was repeated except that 0.04 g of silicon tetrachloride was used.

Sample E

The same procedure as in Sample B was repeated except that 0.332 g of n-butyllithium and 0.42 g of silicon tetrachloride were used.

Sample F

Into a reactor comprising two reactor units of 5 l capacity (height diameter ratio=2) connected with each other were continuously charged 1.5 kg/hr of a mixture of styrene and 1,3-butadiene having a styrene content of 10%, 7.5 kg/hr of cyclohexane, 3 g/hr of tetrahydrofuran, and 0.067 g of n-butyllithium based on 100 g of the monomers to perform polymerization at 70° C. Silicon tetrachloride was continuously added into the outlet of the second reactor unit at a rate of 0.03 g per 100 g of the monomers to perform coupling reaction, and then the same procedure in Sample A was taken to obtain the intended polymer.

Sample G

The same procedure as in Sample A was repeated except that 0 g of styrene and 500 g of 1,3-butadiene were used.

Sample H

The same procedure as in Sample A was repeated except that 120 g of styrene, 380 g of 1,3-butadiene, and 0.345 g of n-butyllithium were used.

Sample I

The same procedure in Sample B was repeated except that 5.0 g of tetrahydrofuran was used.

Sample J

The same procedure in Sample B was repeated except that no tetrahydrofuran was used.

Sample K

The same procedure as in Sample B was repeated except that 0.310 g of n-butyllithium was used.

Sample L

The same procedure as in Sample B was repeated except that 0.375 g of n-butyllithium was used.

Sample M

Polymerization was carried out at 60° C. for 2 hours in a reactor of 10 l capacity using 2,500 g of toluene, 500 g of 1,3-butadiene, 0.3 millimol of nickel octanoate, 1.8 millimol of boron trifluoride etherate, and 1.2 millimol of triethylaluminum. Then, 2.5 g of 2,6-di-tertbutyl-p-cresol was added thereto, and desolvation and drying were carried out to obtain a high cis-1,4-polybutadiene (cis-1,4: 95%, trans: 1.43%, vinyl: 2%).

Each of samples A–M was compounded and kneaded with other ingredients according to a compounding recipe as shown in the following Table 2 to obtain a kneaded matter. The extrusion moldability and shrinkage of the kneaded matter were evaluated by a Garvey die extruder and a roll to obtain results as shown in the following Table 3.

Each kneaded matter was added with a vulcanizer, and molded and vulcanized at 145° C. for 25 minutes to obtain a vulcanizate. The properties of the thus obtained vulcanizate are also shown in Table 3.

Moreover, Comparative Example 11 is an example in which the compounding amount of the copolymer rubber is fallen outside of the range defined in the invention. The rubber compositions in Examples 1–4 are excellent not only in the extrusion processability and mill shrinkage but also in the tensile strength, rebound resilience, and wear resistance.

Comparative Example 1 is poor in the extrusion processability, mill shrinkage, tensile strength, cold flow and rebound resilience.

Comparative Example 2 is poor in the extrusion processability, and particularly the extrusion amount and profile.

Comparative Example 3 is poor in the extrusion processability, mill shrinkage, cold flow and rebound resilience.

Comparative Example 4 is poor in the tensile strength and wear resistance.

Comparative Example 5 is poor in the rebound resilience.

Comparative Example 6 is poor in the tensile strength, wear resistance and rebound resilience.

Comparative Example 7 is poor in the rebound resilience and wear resistance.

Comparative Example 8 is poor in the extrusion processability.

Comparative Example 9 is poor in the tensile strength, rebound resilience, wear resistance and cold flow.

Comparative Example 10 is poor in the extrusion processability, mill shrinkage, cold flow and rebound resilience.

Comparative Example 11 is slightly poor in the extrusion processability, mill shrinkage and wear resistance.

TABLE 1

| Sample | A | B | C | D | E | F | G | H | I | J | K | L | M |
|---|---|---|---|---|---|---|---|---|---|---|---|---|---|
| Mooney viscosity ($ML_{1+4}^{100° C.}$) | 33 | 34 | 40 | 33 | 34 | 33 | 33 | 34 | 33 | 35 | 55 | 18 | 33 |
| Content of bound styrene (%) | 5 | 10 | 12 | 10 | 10 | 10 | 0 | 24 | 10 | 10 | 10 | 10 | 0 |
| Content of vinyl bond (%) | 25 | 25 | 18 | 25 | 25 | 25 | 25 | 25 | 40 | 13 | 25 | 23 | 2 |
| $M_w/M_n$ | 1.8 | 1.7 | 1.8 | 1.7 | 1.8 | 2.7 | 1.8 | 1.8 | 1.8 | 1.8 | 1.8 | 1.9 | 2.7 |
| Ratio of branched polymer in | 50 | 45 | 54 | 10 | 90 | 50 | 50 | 49 | 49 | 47 | 48 | 49 | 0 |